(12) United States Patent
Teysseire

(10) Patent No.: US 7,683,196 B2
(45) Date of Patent: Mar. 23, 2010

(54) ISOCYANATE-FREE PRIMER COMPOSITION FOR GLASS AND GLASS CERAMICS

(75) Inventor: Raphael Teysseire, Adklikon b. Regensdorf (CH)

(73) Assignee: Sika Technology AG, Baar (CH)

( * ) Notice: Subject to any disclaimer, the term of this patent is extended or adjusted under 35 U.S.C. 154(b) by 616 days.

(21) Appl. No.: 10/563,438

(22) PCT Filed: Jul. 30, 2004

(86) PCT No.: PCT/EP2004/051668

§ 371 (c)(1),
(2), (4) Date: Aug. 22, 2006

(87) PCT Pub. No.: WO2005/012382

PCT Pub. Date: Feb. 10, 2005

(65) Prior Publication Data

US 2007/0043196 A1    Feb. 22, 2007

(30) Foreign Application Priority Data

Jul. 31, 2003    (EP) .................................. 03017308

(51) Int. Cl.
C07F 7/02    (2006.01)
(52) U.S. Cl. ........................ 556/400; 556/407; 556/465
(58) Field of Classification Search .................. 525/457
See application file for complete search history.

(56) References Cited

U.S. PATENT DOCUMENTS 4,963,614 A    10/1990    Ito et al.
5,109,057 A    4/1992     Tsuno et al.
5,342,867 A *  8/1994     Ryan et al. ................. 524/101
6,133,395 A    10/2000    Miyata et al.
6,281,322 B1   8/2001     Groth et al.
6,403,175 B1 * 6/2002     Speier et al. ............... 428/34.4
6,762,241 B1 * 7/2004     Blum et al. ................. 524/588
2002/0142169 A1 10/2002   Hofacker et al.

FOREIGN PATENT DOCUMENTS

EP    1 006 132 A1        6/2000
WO    WO 00/59974 A1 *    10/2000
WO    WO 02/059224 A1     8/2002
WO    WO 03/054049 A1     7/2003

* cited by examiner

Primary Examiner—Randy Gulakowski
Assistant Examiner—Kyle Baumstein
(74) Attorney, Agent, or Firm—Oliff & Berridge, PLC

(57) ABSTRACT

The invention relates to a primer composition comprising a compound A1 which contains isocyanate-reactive groups. In order to produce said compound A1, a polyisocyanate A that is provided with at least three isocyanate groups, at least one silane B of formula (I), and a crosslinking agent C comprising at least three isocyanate-reactive functional groups are used. Also disclosed is the use of the inventive primer composition as a primer for adhesives, sealing compounds, or floor coverings, especially one-component moisture-hardening polyurethane adhesives or polyurethane sealing compounds based on polyurethanes or polyurethane-silane hybrids. The inventive primer composition is characterized particularly by excellent adhesion to glass and glass ceramics as well as an extended open time.

24 Claims, No Drawings

ISOCYANATE-FREE PRIMER COMPOSITION FOR GLASS AND GLASS CERAMICS

TECHNICAL FIELD

The invention relates to isocyanate-free premier compositions for glass and glass ceramics in order to improve the adhesion of an adhesive or a sealant.

STATE OF THE ART

Adhesives, coatings, sealants, floorings and other systems are based on the reactive binders. The adhesion of these reactive systems to diverse substrates is often unsatisfactory. Therefore, often the so-called "primers" are used. A primer forms an adhesion bridge between the substrate and the used binder. A primer is also a chemically reactive system and is applied on the substrate.

In order to obtain a set-up of adhesion of the primer with the substrate, the primer must be provided with a definite time, the so-called "flash off time", in order to form a film and at least to partially cross-link before the adhesive or any other reactive system can be applied. However, the application of this system is restricted during the so-called "open time" during which the adhesion to the primer is ensured. An adhesion to the primer is no longer ensured on exceeding the open time. Open time is thus determined in tests in which variably long period between the application of the primer and the adhesive is maintained and the adhesion of the bonds after hardening of the adhesive is determined. As a model the adhesion between the primer and the adhesive or another reactive system is formed by a reaction between these materials. The ventilation time must be as short as possible in an industrial application in order to ensure a fast and cost-effective processing. This means that the adhesion set-up of the primer with the substrate must be as fast as possible so that an application of an adhesive or any other reactive system can be done as fast as possible. However, in doing this, the problem of interruption in the production process occurs because of, for example, technical defects, end of shift or weekends, so that a longer period of a few hours to days or even weeks can elapse between the application of the primer and the application of the adhesive or any other reactive systems. This is especially disturbing in continuously running industrial applications. Moreover, the trend in automotive engineering is to shift the pretreatment away from the industrial assembly line into the factory of the supplier so that an open time of up to a few weeks could elapse between the applications of the primer in the factory of the supplier to the application of the adhesive in the production factory.

There is a great demand for primers having long open times in order to also ensure a good adhesion in these cases.

Glass and glass ceramics are extremely important substrates for the bonding technology, particularly in automotive engineering. Traditionally, primers based on isocyanates are used for this. On the one hand isocyanates are regularly the topic of controversial discussion concerning toxicity, and on the other hand, isocyanates are reactive substances. In particular, they react with the atmospheric humidity so that the number of free isocyanate groups is very considerably reduced within a short time after application of an isocyanate primer. Therefore, normal isocyanate-based primers are generally suitable only for short open times.

U.S. Pat. No. 4,963,614 describes a primer for glass which contains a silane and a polyisocyanate, a film-forming component as well as carbon black. However, the silane-polyisocyanate reaction product disclosed therein is not provided with an isocyanate-reactive group, which infers to poor adhesion characteristics with polyurethane adhesive applied on it, particularly after cataplasma storage. No data is provided on the open time of these primers.

U.S. Pat. No. 5,109,057 describes a primer which is produced from a polyurethane pre-polymer which is carrying isocyanate groups and a silane consisting of NCO-reactive functional groups. This primer seems to exhibit an improved UV-stability. No data is provided on the open time of these primers.

WO 02/059224 A1 describes a two-component primer, which comprises a curing agent comprising of an adduct of an alkoxy silane and a polyisocyanate having a mean NCO-functionality from 2.5 to 5.0 and an isocyanate content from 8 to 27 wgt.-%, and a lacquer resin reactive to the isocyanate groups as the second component. However no primary amino silanes are disclosed as alkoxy silane.

With the state of art it is not possible so far to obtain an isocyanate-free primer which exhibits a good adhesion to glass and glass ceramics and a long open time.

DETAILED DESCRIPTION OF THE INVENTION

The task of the invention is to overcome the described disadvantages and problems of the primer for glass and make available a primer which also exhibits a good adhesion to glass and glass ceramics and a long open time. It was unexpectedly found that the disadvantages of the state of the art could be eliminated by the inventive primer composition according to claim 1. At the same time a good adhesion at short flash off times, respectively at short waiting times between the application of the primer and the adhesive, is ensured.

Methods for Realization of the Invention

The present invention relates to a primer composition comprising a compound A1 which contains isocyanate-reactive groups. A polyisocyanate A, comprising at least three isocyanate groups, as well as at least one silane B of the formula (I), as well as a cross-linking agent C having three isocyanate-reactive functional groups are used for producing this compound A1.

Molecules which comprise formally two or more of the respective functional groups are designated in the entire document by the prefix "poly" in "polyisocyanate" and "polyol".

By the term "isocyanate-reactive functional groups" those chemical functional groups which react with an aliphatic or aromatic isocyanate group at room temperature or at temperature of up to 100° C., if necessary in the presence of a suitable catalyst, are understood.

The polyisocyanate A, used for producing compound A1, has at least 3 isocyanate groups. In particular 3, 4, 5 or 6, preferably 3 or 4 isocyanate groups are present.

These polyisocyanates are preferably low-molecular polyisocyanates having a molecular weight of less than 2000 g/mol, particularly less than 1000 g/mol. The molecular weight preferably is between 400 and 900 g/mol.

On the one hand such low molecular polyisocyanates are the diisocyanate-polyol-adducts which are produced by the reaction of low molecular polyols with diisocyanates in excess of the diisocyanate leading to a NCO-functionality of three or more. Examples of such diisocyanate-polyol-adducts are those from a polyol, as mentioned further below as cross-linking agent C, and an aliphatic or aromatic diisocyanate. In particular to be mentioned are adducts from trimethylolpropane, glycerol or pentaerythritol as polyol and HDI, TDI or IPDI as diisocyanate.

On the other hand, they are low molecular oligomers or polymers of diisocyanates. For example it is here with polymeric MDI (4,4'diphenylmethandiisocyanate), such as for example the one which is commercially available as Voranate M-580 (Dow).

Particularly suitable are the low-molecular polymers of the monomers
- HDI, for example commercially available as Desmodur N-3300 (Bayer), Desmodur N-3600 (Bayer), Luxate HT 2000 (Lyondell); or as Desmodur N-100 (Bayer), Luxate HDB 9000 (Lyondell);
- IPDI, for example commercially available as Desmodur Z 4470 (Bayer), Vestanat T 1890/100 (Hüls), Luxate IT 1070 (Lyondell);
- TDI, for example commercially available as Desmodur IL (Bayer);
- TDI/HDI.

In particular, they are biuretes and isocyanurates, preferably of low molecular diisocyanates. Diisocyanates particularly suitable for this are 2,4- and 2,6-toluylenediisocyanate (TDI), 4,4'-diphenylmethanediisocyanate (MDI) as well as its positional isomers, hexamethylendiisocyanate (HDI), 2,2,4- and 2,4,4-trimethyl-1,6-hexamethylenodiisocyanate, tetramethoxybutane-1,4-diisocyanate, butane-1,4-diisocyanate, dicyclohexylmethanediisocyanate, cyclohexane-1,3- and 1,4-diisocyanate, 1,12-dodecamethylenediisocyanate, 1-isocyanato-3,3,5-trimethyl-5-isocyanatomethylcyclohexane (=isophorondiisocyanate or IPDI), as well as the hydrogenated compounds of the said aromatic compounds. Obviously, mixtures of diisocyanates are also possible for producing biuretes and isocyanurates.

The polyisocyanate A is preferably an isocyanurate or a biuret of monomers selected from the group consisting of HDI, IPDI, TDI and mixtures thereof. It is especially an isocyanurate of HDI.

The silane B used for producing compound A1 has the formula (I).

$$X(1)\diagdown\diagup\diagdown\underset{R^2}{\overset{R^3}{\underset{|}{\overset{|}{Si}}}}-OR^1 \quad (I)$$

In formula (I) $R^1$ represents methyl or ethyl. Furthermore, $R^2$ represents a H, a $C_1$- to $C_4$-alkyl or $OR^1$ and $R^3$ represents a H, a $C_1$- to $C_4$-alkyl or $OR^1$. $X(1)$ denotes an isocyanate-reactive group or an organic residue carrying isocyanate-reactive groups and is a primary amino group or an organic residue which has at least a primary amino group. Preferably $X(1)$ is $NH_2$.

Preferably $R^1$ represents methyl. More preferred is $R^3=OR^1$ and even more preferred is $R^3=R^2=OR^1$.

Examples for suitable silanes B of the formula (I) are:
3-Aminopropyltrimethoxysilane, N-(2-aminoethyl)-3-aminopropyltrimethoxysilane, 3-aminopropyltriethoxysilane, N-(2-aminoethyl)-3-aminopropyltriethoxysilane, 3-aminopropylmethyldimethoxysilane, 3-aminopropylmethyldiethoxysilane, 3-aminopropyldimethylmethoxysilane, 3-aminopropyldimethylethoxysilane, N-(2-aminoethyl)-3-aminopropylmethydimethoxysilane, N-(2-aminoethyl)-3-aminopropylmethyldiethoxysilane, N-aminoethyl-3-aminopropylmethyldimethoxysilane, N-aminoethyl-3-aminopropylmethyldimethoxysilane.
3-aminopropyltrimethoxysilane is preferred.

In one embodiment of the invention in addition to the silane of the formula (I) at least another silane of the formula (I')

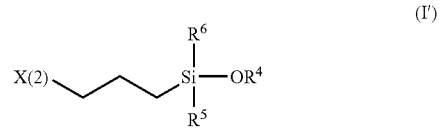

is used for producing compound A1.

In formula (I') $R^4$ represents methyl or ethyl. $R^5$ also represents a H, a $C_1$- to $C_4$-alkyl or $OR^4$ and $R^6$ a H, a $C_1$- to $C_4$-alkyl or $OR^4$. $X(2)$ represents an isocyanate-reactive group or an organic residue carrying isocyanate-reactive groups and is a primary amino, mercapto or hydroxylic group or an organic residue which comprises at least one primary amino, mercapto or hydroxylic group. $X(2)$ is preferably SH or $NH_2$.

Preferably $R^4$ represents methyl. $R^5=OR^4$ is also preferred, more preferred is $R^6=R^5=OR^4$.

Examples for suitable silanes B of the formula (I') are:
3-aminopropyltrimethoxysilane, N-(2-aminoethyl)-3-aminopropyltrimethyoxysilane, 3-aminopropyltriethoxysilane, N-(2-aminoethyl)-3-aminopropyltriethoxysilane, 3-aminopropylmethyldimethoxysilane, 3-aminopropylmethyldiethoxysilane, 3-aminopropyldimethylmethoxysilane, 3-aminopropyldimethylethoxysilane, N-(2-aminoethyl)-3-aminopropylmethyldimethoxysilane, N-(2-aminoethyl)-3-aminopropylmethyldiethoxysilane, N-aminoethyl-3-aminopropylmethyldimethoxysilane, N-aminoethyl-3-aminopropylmethyldiethoxysilane;
3-mercaptopropyltrimethoxysilane, 3-mercaptopropyltriethoxysilane, 3-mercaptopropylmethyldimethoxysilane, mercaptopropylmethyldiethoxysilane.
3-Aminopropyltrimethoxysilane, 3-aminopropyltriethoxysilane or 3-mercaptopropyltrimethoxysilane are preferred.

If several silanes are employed then these can be used as mixture or can be used at different points in time during the production of A1.

Particularly preferred are different silanes B. The two silanes, 3-aminopropyltrimethoxysilane and 3-mercaptopropyltrimethoxysilane, are preferably used for producing compound A1.

The cross-linking agent C used for producing compound A1 has at least three isocyanate-reactive groups. These isocyanate-reactive groups can all be identical or independently different from one another. It is preferred that all groups are identical. The isocyanate-reactive groups are especially selected from primary amino group (NH2), secondary amino group (NH), mercapto group (SH) or hydroxyl group (OH). A mercapto or hydroxylic group is preferred.

At least three isocyanate groups are present, but can also be more, especially 3, 4, 5 or 6. 3 or 4 are preferred.

In case of the cross-linking agent C is preferably a polyol, particularly a triol.

The cross-linking agent C preferably has a molecular weight of 90-1000 g/mol, particularly 90-500 g/mol, preferably 120-150 g/mol. It has advantageously an equivalence weight of 30-350 g/eq, particularly 30-170 g/eq, preferably 30-65 g/eq, related to the isocyanate-reactive functional group which in case of a polyol is the OH-equivalence weight.

Higher molecular weights, respective equivalence weights, are less advantageous because this frequently leads to poor film properties, high viscosities or poor shelf life of the primer.

The cross-linking agent is, for example, pentaerythrite (=2,2-bis-hydroxymethyl-1,3-propanediol), dipentaerythrite (=3-(3-hydroxy-2,2-bis hydroxymethyl-propoxy)-2,2-bis-hydroxymethyl-propane-1-ol), glycerol (=1,2,3-propantriol), trimethylolpropane (=2-ethyl-2-(hydroxymethyl)-1,3-propanediol), trimethylolethane. (=2-(hydroxymethyl)-2-methyl-1,3-propanediol, di(trimethylolpropane) (=3-(2,2-bis-hydroxymethyl-butoxy)-2-ethyl-2-hydroxymethyl-propane-1-ol), di(trimethylolethane) (=3(3-hydroxy-2-hydroxymethyl-2-methyl-propxy)-2-hydroxymethyl-2-methyl-propane-1-ol), diglycerie (=bis-(2,3-dihydroxypropyl)-ether), triglycerine (=1,3-bis-(2,3-dihydroxypropyl)-2-propanol; thioglycerine (=mercapto-1,2-propanediol), 2,3-dimercapto-1-propanol; triethanolamine (=tris-(2-hydroxyethyl)-amine) or triisopropanolamine (=tris-(2-hydroxypropyl)-amine).

The cross-linking agent C, trimethylpropane, is particularly preferred.

The compound A1 can be produced in different ways. In particular the compound A1 can be obtained by the reaction of a cross-linking agent C with an intermediate product AB which is previously formed from a polyisocyanate A and at least one silane B of the formula (I) in a stoichiometric excess of the isocyanate groups of the polyisocyanate A in relation to the isocyanate-reactive groups of silane B.

Such a production method is illustrated, for better understanding, by means of the following reaction scheme simplified for a preferred case. However, this represents only an exemplary representation and cannot cover all the possible variants which can be produced particularly by different number of the reaction partners and stoichiometry.

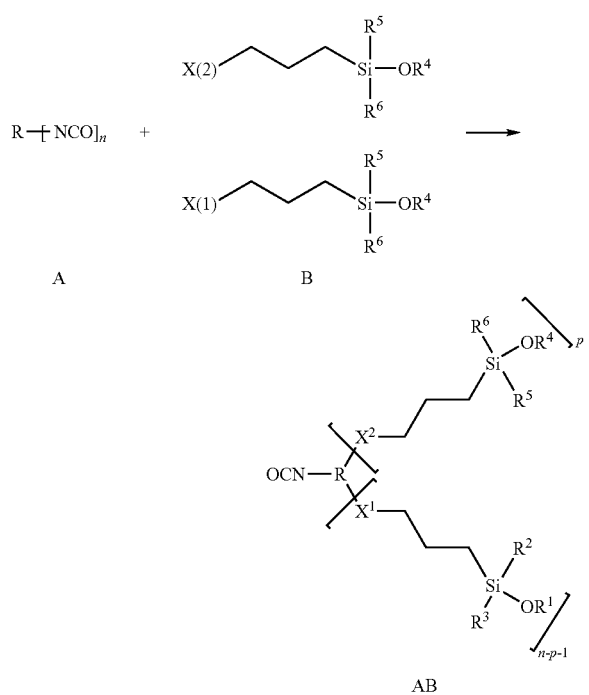

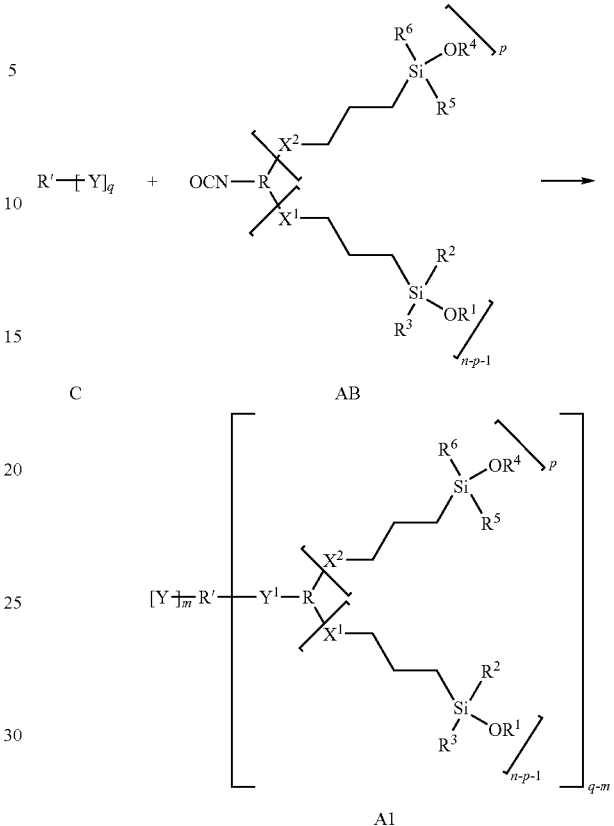

Two molecules B are shown in this example. The application of different symbols for the residue shall illustrate that the residues can vary in the formula (I). Therefore X(1) and X(2) correspond to the possible residues according to formulas (I) and (I').

R represents the polyisocyanate A after removal of all the isocyanate groups. Y represents an isocyanate-reactive group of the cross-linking agent C and R' the cross-linking agent C after removal of all the isocyanate-reactive groups. $X^1$, respectively $X^2$, respectively $Y^1$, represent the functional group which is produced from the reaction of X(1), respectively X(2), respectively Y, with isocyanate, i.e. particularly an urea, urethane or thiocarbamate group.

The indices n, respectively q, indicate the number of isocyanate groups of polyisocyanate A, respectively isocyanate-reactive groups of the cross-linking agent C, and correspond to the values already described for these.

Moreover, p, respectively n−p−1, indicate as to how many isocyanate groups of polyisocyanate A are bonded with silane B of variable type by forming the intermediate product AB. The index p can assume values between 0 and n−1. One of the silanes B is merely bonded to the polyisocyanate A in the cases p=0 and p=n−1.

The intermediate product AB can comprise one or several non-reacted isocyanate groups. However, it is preferred that the intermediate product AB has only one free isocyanate group. Such a case is indicated in the above reaction scheme. If several free isocyanate groups remain in AB, as is the tendency, this leads to higher molecular species and thus to higher viscosities.

Finally index m indicates as to how many free isocyanate-reactive functional groups the compound A1 has. The index m particularly assumes the values 1, 2, 3, or 4, that is depending on q wherein q−m≧2. It is preferably 1 or 2. m=1 is considered as particularly preferential.

The intermediate product AB can be produced by the participation of at least one silane B. But several silanes B can also participate, particularly 2 or 3. The intermediate product AB is preferably produced from two different silanes B. These two silanes of the formula (I) have different isocyanate-reactive groups X(1) and X(2).

If several silanes B are used then these silanes can be directly used as mixture in the production or successively added. It appeared particularly suitable if at first one silane is added and a second or further silane is added to the reaction partner in a further step.

The compound A1 has at least one isocyanate-reactive functional group. Several such groups are possible. In particular it deals with 1, 2, 3 or 4 such groups, preferably 1 or 2 such groups, particularly preferred 1 such group. The isocyanate-reactive group it particularly a primary amino group ($NH_2$), secondary amino group (NH), mercapto group (SH) or hydroxyl group (OH). Preferably it is a mercapto or hydroxylic group. If the compound A1 has several such groups then these groups can all be same or different from one another.

On the one hand it is desirable that the compound is cross-linked by the cross-linking agent C. On the other it is desirable that not only the primer composition but also the compound A1 no longer contains essentially any free isocyanate groups, i.e they are essentially NCO-free.

Both can be controlled by the stoichiometric ratios in the reaction of the intermediate product AB with the cross-linking agent C. Therefore, it is particularly necessary that the isocyanate-reactive groups of the cross-linking agent are in the stoichiometric excess with regard to the isocyanate groups of the intermediate product AB. For this the relation r is defined as follows:

$$r = \frac{\text{Equivalent NCO-reactive groups}(C)}{\text{Equivalent NCO-reactive groups}(A) - \Sigma \text{Equivalent NCO-reactive groups}(B)}$$

The relation r amounts to the values of >100%. The upper limit represents that value at which formally a 1:1 adduct is formed between the cross-linking agent C and the intermediate product AB, i.e. in which the cross-linking agent no longer plays any cross-linking function. Therefore, the value of r should be clearly lower than this upper limit so that essential components of the cross-linked species are present. If too many 1:1 adduct molecules are present, then the stability of the primer is strikingly poor. The component of 1:1-adducts should not be more than 20% related to A1. Therefore the value of r has also a very high influence on the number of free isocyanate-reactive groups of the end-product A1.

The person skilled in the art understands that, in addition to the compound A1, also such products in which free isocyanate-reactive groups are no longer present are formed on the one hand, as well as non-bridged reaction products, i.e. 1:1 adducts of the cross-linking agent C and intermediate product AB, are also formed on the other hand. However, it should be considered that the amount of these by-products is as little as possible.

The values of r are between >100% and <300% for the specially preferred case in which the cross-linking agent C is a tri-functional molecule and the intermediate product AB contains one free NCO-group.

Here, the values of 105%-200%, preferably values of 105-150%, are to be particularly selected, to obtain a cataplasma-stable primer.

A specially preferred embodiment of the primer composition contains a compound A1 which is produced from an isocyanurate of the formula (II) or a biuret of the formula (IIa), two silanes of the formula (III) and (IV), and trimethylolpropane (V).

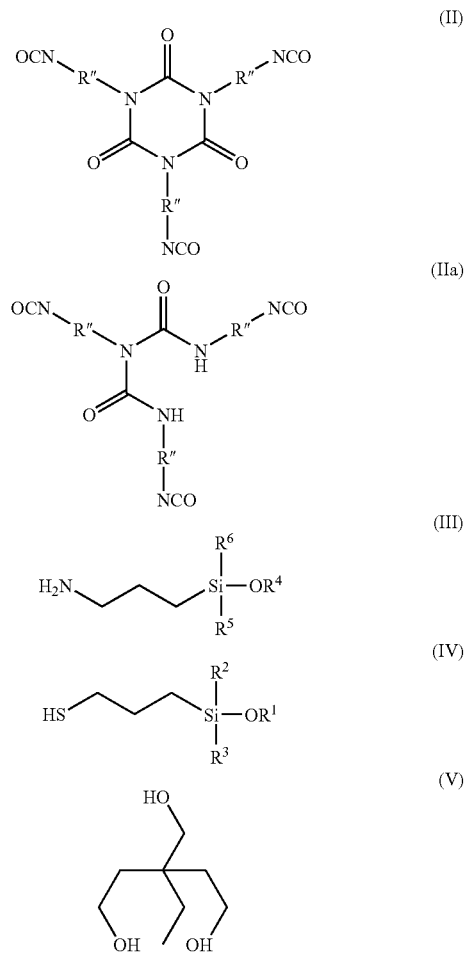

whereby the residues $R^1$, $R^2$, $R^3$, $R^4$, $R^5$ and $R^6$ represent the already defined residues. R" is a divalent residue and particularly represents an aliphatic alkene residue, preferably the hexamethylene residue.

The intermediate product AB is preferably produced in a two-step process, particularly in which the mercaptosilane is used at first in a first step and the amino silane is used in a second step.

The compound A1 thus produced may be represented by the formula (VI) and formula (VII).

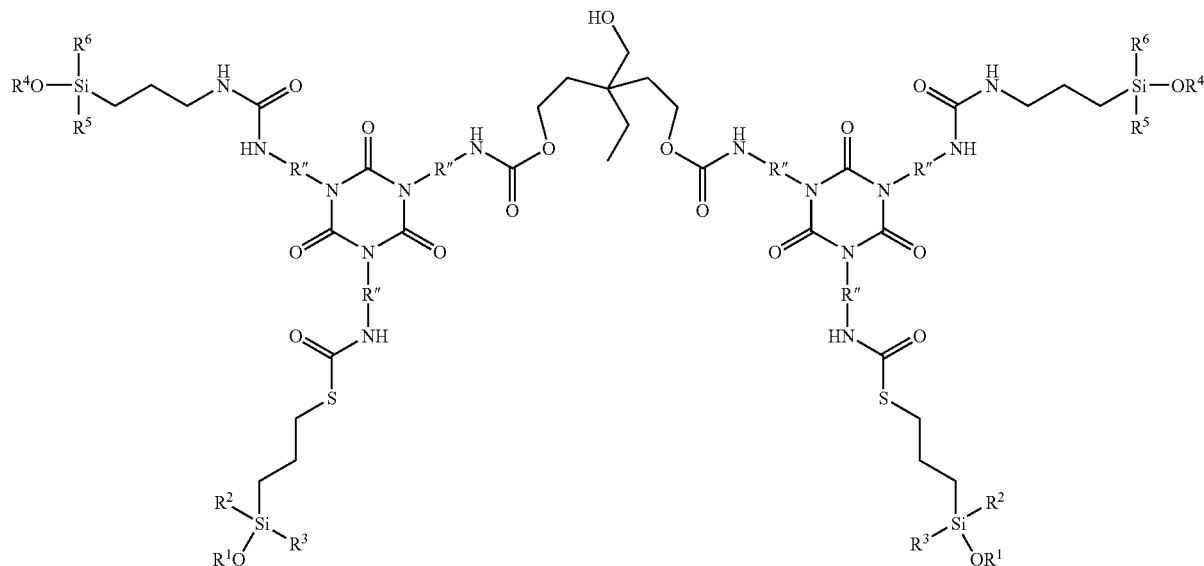

(VI)

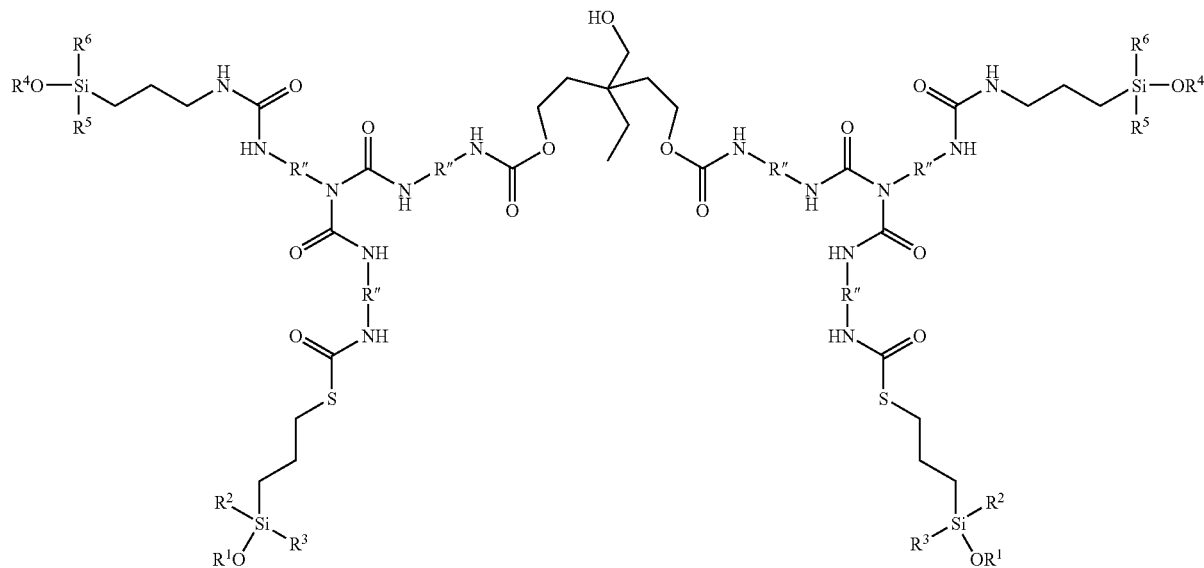

(VII)

The compound A1 has at least one isocyanate-reactive functional group. Several such groups are possible. It particularly deals with 1, 2, 3 or 4 such groups, preferably 1 or 2 such groups, particularly preferred 1 such group. The isocyanate-reactive group is preferably selected from a primary amino group ($NH_2$), secondary group (NH), mercapto group (SH) or hydroxyl group (OH). A mercapto group (SH) or hydroxyl group (OH) is to be particularly preferred. If the compound A1 has several such groups then these groups can all be the same or different from one another.

The person skilled in the art understands that, in addition to the compound A1, also such products in which free isocyanate-reactive groups are no longer present are also formed on the one hand as well as non-bridged reaction products, i.e. 1:1 adducts of the cross-linking agent C and intermediate product AB, are also formed on the other hand. However, it should be considered that the amount of these by-products is as little as possible.

In an embodiment the primer composition also comprises at least one solvent LM1 which is inert to isocyanates at room temperature. This solvent is used preferably already for producing of compound A1, respectively of the intermediate product AB. The solvent can get into the primer formulation, if necessary, only after the production of compound A1. The solvent is a volatile solvent and, in addition to the aromatic solvent like xylene, toluene, mesitylene, particularly comprises esters, specially acetates and ketones. The solvent is particularly selected from the group consisting of xylene, toluene, acetone, hexane, heptane, octane, methylethyl ketone, methylpropyl ketone, methylisopropyl ketone, methylbutyl ketone, dieeethyl ketone, diisopropyl ketone, methylacetate, ethylacetate, propylacetate, butylacetate, methoxyethylacetate, methoxypropylacetate and 2-(2-methoxyethoxy)-ethylacetate. These solvents are preferably used in mixtures.

Further solvents LM2 can be added to the primer after producing compound A1. These solvents can also be reactive to isocyanates. They are preferably slightly volatile solvents having a boiling point of less than 100° C. Alcohols such as methanol, ethanol, propanol, isopropanol and sec. butanol are particularly suitable for this. Isopropanol is particularly suitable.

Solvents are mainly used for reduction of the viscosity as well as for optimization of the flash off behavior.

Moreover the primer composition may contain the coupling agent HV. Titanates, zirconates or silanes represent exemplarily such coupling agents. In particular they are preferably silicon-organic compounds. On the one hand the said silanes B as well as 3-glycidyloxypropyl-trialkoxy silanes, methacryloxypropyltrialkoxy silanes as well as vinyltrialkoxy silanes are the preferred silicon-organic compounds.

Trialkoxy silanes are particularly preferred. It appears that this additional coupling agent is advantageously a trialkoxy silane comprising a primary amino group, particularly a trimethoxy silane comprising a primary amino group, or a trialkoxy silane consisting of a vinyl group.

Moreover, the primer composition can also contain a catalyst KAT, particularly a tin-organic catalyst. These catalysts are normally polyurethane catalysts. The tin-organic catalyst is preferably selected from the group consisting of dibutyltindilaurate, dibutyltindichloride, tinthioester complexes, mono-n-butyltintrichloride, di-n-butyltin oxide, di-n-butyltindiacetate and dibutyltincarboxylate.

Moreover, the primer composition can contain of a filler F, like for example silica, talc, chalks and carbon blacks. A specially preferred filler is carbon black.

Moreover, commonly used additives in the primer chemistry can be used. Examples of unlimited type for this are UV- and heat stabilizers, flow-control agents, film formers, thixotroping agents as well as chemical and physical drying agents.

A specially preferred embodiment of a primer composition comprises, in addition to the compound A1, at least one solvent LM1, at least one coupling agent HV, a catalyst KAT as well as carbon black as filler F.

The described composition is produced and stored by exclusion of moisture.

The primer composition is suitable as primer for diverse substrates. It is particularly suitable for glass, glass ceramics, metals and alloys as well as for diverse plastics. The inventive primer composition is specially suited for glass and glass ceramics, particularly those used in automotive engineering.

It can be advantageous to pre-treat the substrates before the application. Such pre-treatment methods include physical and/or chemical pre-treatment, for example polishing, sandblasting, brushing etc, or treatment with detergents, solvents, coupling agents, solutions of coupling agents.

The primer is applied to a substrate by means of brush, felt, cloth or sponge. This application can be done manually or automatically, particularly by means of robots. Moreover, several layers of the primer composition can also be applied.

The primer composition is advantageously used as primer for adhesives, sealants, floorings, particularly for 1-component, moisture-curing polyurethane adhesives or sealants based on polyurethanes or polyurethane-silane-hybrides. Preferred application fields of these primers are areas where industrially prepared components are also bonded. It deals particularly with applications where the primer is applied in the supplier's factory.

The inventive primer composition is characterized by an excellent adhesion on glass and glass ceramics which, even after drastic stresses, such as for example by cataplasma test (7 days storage in 100% relative atmospheric humidity at 70° C.) remain intact. Moreover, the primer is characterized by a long open time of more than a month. The fact that the inventive primer can be used already after a short flash off times of typically 30 seconds is also extraordinary.

EXAMPLES

| Raw materials | Reference source |
|---|---|
| Methyl-ethylketone ("MEK") | Scheller, Thommen |
| 4-Toluensulfonylisocyanate ("TI") | Bayer |
| Desmodur N100 ("N100") (NCO-content 22%) | Bayer |
| 3-Aminopropyltrimethoxysilane (Silquest A-1110) ("Aminosilane") | Osi Crompton |
| N-Butyl-3-aminopropyltrimethoxysilane (Dynasilan A-1189) ("sec.Aminosilane") | Degussa-Hiils |
| 3-Mercaptopropyltrimethoxysilane (Silquest A-189) ("Mercaptosilane") | Osi Crompton |
| Vinyltrimethoxysilane (Silquest A-171) ("Vinylsilane") | Osi Crompton |
| Trimethylolpropane | BASF |
| Dibutyltindilaurate | Rohm & Haas |

Primer Compositions

Exemplary Production of a Primer Composition: P-01

161.8 g Desmodur N100 is reacted with 54.2 g mercapto silane in a preliminary step in 54 g 1:1-solvent mixture of xylene and methoxypropylacetate in inert atmosphere during 4 hours at increased temperature. The mercapto silane is added in a slow manner.

In a subsequent step 64 g of amino silane is slowly dropped into the product of the first step in the presence of 5 g of drying agent as well as 649 g methylethyl ketone in inert atmosphere. After termination of this reaction 11.5 g trimethyl propane is slowly added by stirring at increased temperature till no NCO-content can be measured. At the end the additional constituents like catalyst and vinyl silane are also added.

TABLE 1

Primer Compositions

| | | P-01 | P-02 | P-03 | P-04 | P-05 | P-06 | P-07 | Ref. |
|---|---|---|---|---|---|---|---|---|---|
| A | N100 | 16.18 | 16.18 | 16.18 | 16.18 | 16.18 | 16.18 | 16.18 | 16.18 |
| B | Mercaptosilane | 5.42 | 5.42 | 5.42 | 5.42 | 5.42 | 5.42 | 5.42 | 5.42 |
| B | Aminosilane | 6.40 | 6.40 | 6.40 | 4.00 | 8.00 | 6.40 | 6.40 | 6.40 |
| C | Trimethylolpropane | 1.15 | 1.05 | 1.30 | 1.75 | 0.75 | 1.15 | 2.63 | |

TABLE 1-continued

Primer Compositions

| | | | | | | | | |
|---|---|---|---|---|---|---|---|---|
| Xylene/Methoxypropylacetate (1/1)(w/w) | 5.40 | 5.40 | 5.40 | 5.40 | 5.40 | 5.40 | 5.40 | 5.40 |
| Methylethylketon | 64.92 | 65.02 | 64.77 | 66.72 | 63.72 | 64.42 | 62.94 | 65.57 |
| Drying agent | 0.50 | 0.50 | 0.50 | 0.50 | 0.50 | 0.50 | 0.50 | 0.50 |
| DBTL | 0.03 | 0.03 | 0.03 | 0.03 | 0.03 | 0.03 | 0.03 | 0.03 |
| Vinylsilane | | | | | | 0.50 | 0.50 | 0.50 |
| r | 120% | 109% | 135% | 112% | 134% | 120% | 274% | 0% |

| | | P-01 | P-08 | Ref. | Ref-1. | Ref-2 | Ref-3 |
|---|---|---|---|---|---|---|---|
| A | N100 | 16.18 | 16.18 | 16.18 | 16.18 | 16.18 | 16.18 |
| B | Mercaptosilan | 5.42 | | 5.42 | 5.42 | | 12.43 |
| B | Aminosilane | 6.40 | 11.35 | 6.40 | | | |
| | sek.Aminosilane | | | | 8.40 | 14.90 | |
| C | Trimethylolpropane | 1.15 | 1.15 | | 1.15 | 1.15 | 1.15 |
| | Xylene/Methoxypropylacetate (1/1)(w/w) | 5.40 | 5.40 | 5.40 | 5.40 | 5.40 | 5.40 |
| | Methylethylketon | 64.92 | 65.02 | 65.57 | 65.02 | 65.02 | 65.02 |
| | Drying agent | 0.50 | 0.50 | 0.50 | 0.50 | 0.50 | 0.50 |
| | DBTL | 0.03 | 0.03 | 0.03 | 0.03 | 0.03 | 0.03 |
| | Vinylsilane | | | 0.50 | 0.50 | 0.50 | 0.50 |
| | r | 120% | 120% | 0% | 120% | 120% | 120% |

The other examples P-02 to P-08 were prepared in similar manner with the amounts indicated in table 1.

The reference example Ref. shows no cross-linking agent C. The reference examples Ref-1, or Ref-2, correspond to the examples P-01, or P-08, whereby the primary aminosilane was substituted by the molar amount of a secondary aminosilane. The reference example Ref-3 corresponds to the examples P-01 whereby the primary aminosilane was substituted by the molar amount of the mercaptosilane, and thus contains no primary aminosilane.

Pretreatment of the Substrate and Application of the Primer

| Substrate | Source |
|---|---|
| Float glass | Firm Rocholl, Schönbrunn, Germany |
| Glass with bismuth-based ceramic coating Cerdec 14259 | Firm Rocholl, Schönbrunn, Germany |

The substrates were cleaned by a mixture of isopropanol/water (1/1 w/w). The primer was applied after a waiting time of 5 min. The non-tin-side of the glass was used for adhesion tests.

Application of the Adhesive and Test Methods

After a waiting time t specified in table 2 after the application of the primer a bead of adhesive was applied onto said primer. The following moisture curing polyurethane- or silane-modified polyurethane adhesives which are commercially obtainable from Sika Schweiz AG are used:

| | |
|---|---|
| Sikaflex ®-250 HMA-1 | ("HMA-1") |
| Sikaflex ®-250 DM-1 | ("DM-1") |
| Sikaflex ®-250 DM-2 | ("DM-2") |
| Sikaflex ®-555 | ("SF-555") |

The adhesive was tested after a curing period of 7 days in a climatised room ("KL") (23° C., 50% rel. atmospheric humidity) as well as after subsequent cataplasma storage (CP) of 7 days at 70° C., 100% rel. atmospheric humidity.

The adhesion of the adhesive was tested by means of "bead test". For this, incision is made at the end just over the adhesive surface bonding surface. The sectioned end of bead is held with round pliers and pulled from the substrate. This takes place by careful rolling of the bead on the tips of the pliers as well as by placing a cut section perpendicular to the direction of the bead till the blank substrate. The bead speed of peeling off of the bead is to be selected in such a manner that about every 3 seconds a cut section must be made. The test distance must correspond to at least 8 cm. The assessment is made based on the amount of adhesive remaining on the substrate after peeling off of the adhesive (cohesive failure). The assessment of the adhesion properties is done by evaluating the cohesive part on the adhesion surface:

1=>95% cohesive failure

2=75-95% cohesive failure

3=25-75% cohesive failure

4=<25% cohesive failure

It is indicated by adding "FH" that the adhesive shows a film adhesion on the primer leading to a fracture between the primer and adhesive. It is indicated by adding "P" that the primer peels off from the substrate and therefore the adhesion of the primer to the substrate represents a weak point. Test results with cohesive failures of less than 75% are considered as being unsatisfactory.

Results

Table 2 shows the results of the adhesion tests on glass of the examples P-01 to P-07 as well as the reference examples Ref. for short (1 minute, 10 minutes) and long (1 week, 2 weeks, 1 month) open times which represent the waiting times between the application of the primer and of the adhesive.

TABLE 2

Adhesion results of primers having variable open times.

| | | \multicolumn{10}{c}{Open time} |
| | | 1 min | | 10 min | | 1 w | | 2 w | | 1 m Storage | |
| Primer | Adhesive | KL | CP | KL | CP | KL | CP | KL | CP | KL | CP |
|---|---|---|---|---|---|---|---|---|---|---|---|
| P-01 | HMA-1 | 1 | 1 | 1 | 1 | 1 | 1 | 1 | 1 | 4 | 1 |
| P-01 | DM-1 | 1 | 1 | 1 | 1 | 1 | 1 | 3FH | 1 | 2 | 1 |
| P-01 | DM-2 | 1 | 1 | 1 | 1-2 | 1 | 1 | 1 | 1 | 1-2 | 1 |
| P-01 | SF-555 | 1 | 1 | 1 | 1-2 | 1 | 1 | 1 | 1 | 1 | 1 |
| P-02 | HMA-1 | 1 | 1 | 1 | 1 | 1 | 1 | 1 | 2 | 4 | 1 |
| P-02 | DM-1 | 1 | 1 | 1 | 1 | 1 | 1 | 1 | 2 | 2 | 1 |
| P-02 | DM-2 | 1 | 1 | 1 | 1 | 1 | 1 | 1 | 1 | 1-2 | 1 |
| P-02 | SF-555 | 1 | 1 | 1 | 2P | 1 | 1 | 1 | 1 | 1 | 1 |
| P-03 | HMA-1 | 1 | 1 | 1 | 1 | 1 | 1 | 1 | 3 | 4 | 1 |
| P-03 | DM-1 | 1 | 1 | 1 | 1 | 1 | 1 | 1 | 1 | 2 | 1 |
| P-03 | DM-2 | 1 | 1 | 1 | 1 | 1 | 1 | 1 | 1 | 1-2 | 1 |
| P-03 | SF-555 | 1 | 1 | 1 | 1 | 1 | 1 | 1 | 1 | 1 | 1 |
| P-04 | HMA-1 | 1 | 1 | 1 | 1 | 1 | 1 | 2 | 2 | 4 | 1 |
| P-04 | DM-1 | 1 | 1 | 1 | 1 | 1 | 1 | 1 | 1 | 3 | 1 |
| P-04 | DM-2 | 1 | 2-3P | 1 | 1 | 1 | 1 | 1 | 1 | 2-3 | 1 |
| P-04 | SF-555 | 1 | 1 | 1 | 1 | 1 | 1 | 1 | 1 | 1 | 1 |
| P-05 | HMA-1 | 1 | 2TB | 1 | 1 | 1 | 1 | 1 | 4P | 4 | 1 |
| P-05 | DM-1 | 1 | 1 | 1 | 1 | 1 | 1 | 1 | 4P | 1-2 | 1 |
| P-05 | DM-2 | 4FH | 4FH | 1 | 4FH | 1 | 1 | 1 | 4P | 1-2 | 1 |
| P-05 | SF-555 | 2 | 3 | 1 | 1 | 1 | 1 | 1 | 1 | 1 | 1 |
| P-06 | HMA-1 | 1 | 2 | 1 | 4 | 2 | 1 | 2 | 1 | 4 | 1 |
| P-06 | DM-1 | 1 | 2 | 1 | 2 | 1 | 1 | 1 | 1 | 3 | 1 |
| P-06 | DM-2 | 1 | 2 | 1 | 4 | 1 | 2 | 1 | 1 | 1 | 1 |
| P-06 | SF-555 | 1 | 1 | 1 | 1 | 1 | 4 | 1 | 1 | 1 | 4 |
| P-07 | HMA-1 | 3 | 4 | 3 | 4 | 1 | 1 | 1 | 3-4 | 1 | 1 |
| P-07 | DM-1 | 3-4 | 3 | 3 | 4 | 1 | 1 | 1 | 2-3 | 1 | 1 |
| P-07 | DM-2 | 3 | 3 | 3 | 4 | 1 | 2 | 1 | 3-4 | 1 | 1 |
| P-07 | SF-555 | 1 | 1 | 1 | 1 | 1 | 1 | 1 | 3-4 | 1 | 3 |
| Ref. | HMA-1 | 4 | 4 | 4 | 4 | 4 | 4 | 4 | 4 | 4 | 4 |
| Ref. | DM-1 | 4 | 4 | 4 | 4 | 4 | 4 | 3 | 4 | 3 | 4 |
| Ref. | DM-2 | 4 | 4 | 4 | 4 | 4 | 4 | 3 | 4 | 4 | 4 |
| Ref. | SF-555 | 1 | 1 | 1 | 1 | 1 | 4 | 1 | 4 | 1 | 4 |
| — | HMA-1 | 4 | 4 | 4 | 4 | 4 | 4 | 4 | 4 | 4 | 4 |
| — | DM-1 | 4 | 4 | 4 | 4 | 4 | 4 | 4 | 4 | 4 | 4 |
| — | DM-2 | 4 | 4 | 4 | 4 | 4 | 4 | 4 | 4 | 4 | 4 |
| — | SF-555 | 1 | 2-3 | 1 | 2-3 | 1 | 2-3 | 1 | 2-3 | 1 | 2-3 |

TABLE 3

Adhesion on glass and glass ceramics

| | | \multicolumn{4}{c}{Substrate} |
| | | Glass | | Glass Ceramics | |
| | | \multicolumn{4}{c}{Open time} |
| | | 10 min | | 10 min Storage | |
| Primer | Adhesive | KL | CP | KL | CP |
|---|---|---|---|---|---|
| P-01 | HMA-1 | 1 | 1 | 1 | 1 |
| P-01 | DM-1 | 1 | 1 | 1 | 1 |
| P-01 | DM-2 | 1 | 1-2 | 1 | 1 |
| P-01 | SF-555 | 1 | 1-2 | 1 | 1 |
| P-02 | HMA-1 | 1 | 1 | 1 | 1 |
| P-02 | DM-1 | 1 | 1 | 1 | 1 |
| P-02 | DM-2 | 1 | 1 | 1 | 1 |
| P-02 | SF-555 | 1 | 2P | 1 | 1 |
| P-03 | HMA-1 | 1 | 1 | 1 | 1 |
| P-03 | DM-1 | 1 | 1 | 1 | 1 |
| P-03 | DM-2 | 1 | 1 | 1 | 1 |
| P-03 | SF-555 | 1 | 1 | 1 | 1 |
| P-04 | HMA-1 | 1 | 1 | 1 | 1 |
| P-04 | DM-1 | 1 | 1 | 1 | 1 |
| P-04 | DM-2 | 1 | 1 | 1 | 1 |
| P-04 | SF-555 | 1 | 1 | 1 | 1 |

TABLE 3-continued

Adhesion on glass and glass ceramics

| | | Substrate | | | |
|---|---|---|---|---|---|
| | | Glass | | Glass Ceramics | |
| | | Open time | | | |
| | | 10 min | | 10 min | |
| | | Storage | | | |
| Primer | Adhesive | KL | CP | KL | CP |
| P-05 | HMA-1 | 1 | 1 | 1 | 1 |
| P-05 | DM-1 | 1 | 1 | 1 | 1 |
| P-05 | DM-2 | 1 | 4FH | 4FH | 4FH |
| P-05 | SF-555 | 1 | 1 | 1 | 1 |
| P-08 | DM-1 | 1 | 1 | 1 | 2 |
| P-08 | DM-2 | 1 | 2 | 1 | 2 |
| P-08 | SF-555 | 1 | 2 | 2 | 1 |
| Ref-1 | DM-1 | 4 | 4 | 3 | 4 |
| Ref-1 | DM-2 | 5 | 4 | 2 | 3 |
| Ref-1 | SF-555 | 2 | 2 | 3 | 3 |
| Ref-2 | DM-1 | 4 | 5 | 4 | 3 |
| Ref-2 | DM-2 | 4 | 5 | 1 | 2 |
| Ref-2 | SF-555 | 2 | 2 | 3 | 1 |
| Ref-3 | DM-1 | 3 | 4 | 3 | 3 |
| Ref-3 | DM-2 | 4 | 4 | 4 | 4 |
| Ref-3 | SF-555 | 1 | 2 | 2 | 1 |
| — | HMA-1 | 4 | 4 | 4 | 4 |
| — | DM-1 | 4 | 4 | 4 | 4 |
| — | DM-2 | 4 | 4 | 4 | 4 |
| — | SF-555 | 1 | 2-3 | 1 | 4 |

Table 2 shows that the inventive primer is characterized by an excellent adhesion to glass. Moreover, it can be seen that the example P-06 exhibits considerably poorer adhesions as compared to comparison to the other examples P-01 to P-05, particularly at short open times, but is still clearly better than the reference example Ref. as well as the example without the primer.

Table 3 shows the comparison between adhesion to glass and glass ceramics in which the inventive primer exhibits extremely good adhesion both to glass and also to glass ceramics. In case of the silane modified adhesive Sikaflex®-555, it is apparent that the adhesion is also retained not only in air-conditioned storage but also in cataplasma also in case of glass ceramics. In case of primer P-05 the adhesive exhibits a certain weakness in adhesion with the result that a film adhesion occurs, but this means that the primer shows a good adhesion on the substrate.

A primer P-01f filled with 10% carbon black was produced on the basis of primer P-01. Its adhesion results after different long storage are shown in table 4. The primer was stored for period indicated in the table at the stated temperature and subsequently applied to glass as described. After the stated open time the adhesive was subsequently applied and tested after 7 days of curing, respectively after the subsequent cataplasma storage of 7 days.

TABLE 4

Adhesions as function of storage duration and open time of P-01f

| | | | P-01f | | | | | | | | |
|---|---|---|---|---|---|---|---|---|---|---|---|
| | | | Open time | | | | | | | | |
| | | | 3 min | | 10 min | | 2 m | | 3 m | | 4 m | |
| Temperature | Duration | Adhesive | KL | CP | KL | CP | KL | CP | KL | CP | KL | CP |
| 23° C. | 1 m | HMA-1 | 1 | 1 | 1 | 1 | 1 | 1 | 1 | 1 | 4 | 3 |
| | | DM-1 | 1 | 1 | 1 | 1 | 1 | 1 | 1 | 1 | 1 | 1 |
| | | DM-2 | 1 | 3 | 1 | 2 | 1 | 1 | 1 | 1 | 1 | 1 |
| 23° C. | 9 m | HMA-1 | 1 | 4 | n.b. | n.b. | 1 | 1 | 4 | 4 | n.b. | n.b. |
| | | DM-1 | 1 | 1 | n.b. | n.b. | 1 | 1 | 4 | 4 | n.b. | n.b. |
| | | DM-2 | 1 | 1 | n.b. | n.b. | 3 | 4 | 1 | 1 | 1 | 1 |
| 23° C. | 12 m | HMA-1 | n.b. | n.b. | 3 | 1 | 1 | 1 | 1 | 3 | n.b. | n.b. |
| | | DM-1 | n.b. | n.b. | 3 | 1 | 1 | 5 | 1 | 1 | n.b. | n.b. |
| | | DM-2 | n.b. | n.b. | 1 | 1 | 1 | 1 | 1 | 1 | n.b. | n.b. |
| 50° C. | 1 m | HMA-1 | 1 | 1 | 1 | 1 | 3 | 1 | 3 | 2 | 4 | 1 |
| | | DM-1 | 1 | 1 | 1 | 1 | 3 | 1 | 1 | 1 | 3 | 1 |
| | | DM-2 | 1 | 1 | 1 | 1-2 | 2 | 1 | 2 | 1 | 2 | 1 |

(n.b. = not determined)

It is seen from the results of table 4 that the primer exhibits long storage stability and has long open times.

The results of the accelerated ageing, i.e. 1 month at 50° C., show that especially the adhesion deteriorates at longer open times.

The invention claimed is:

1. Primer composition comprising a silane-terminated compound of formula (VI) or (VII) comprising isocyanate-reactive groups

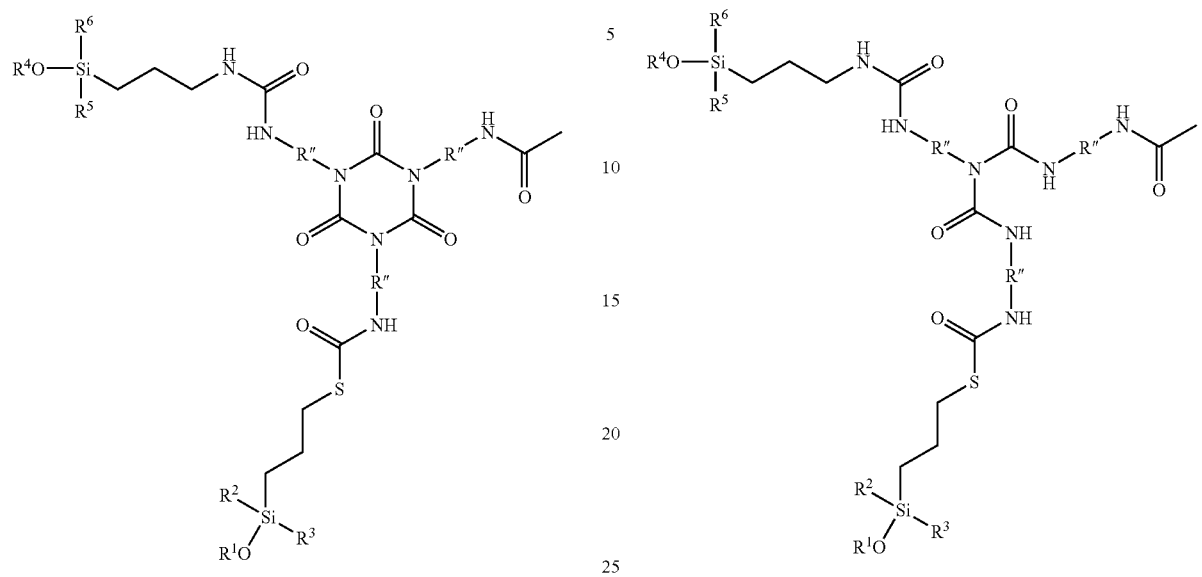
(VI) (VII)
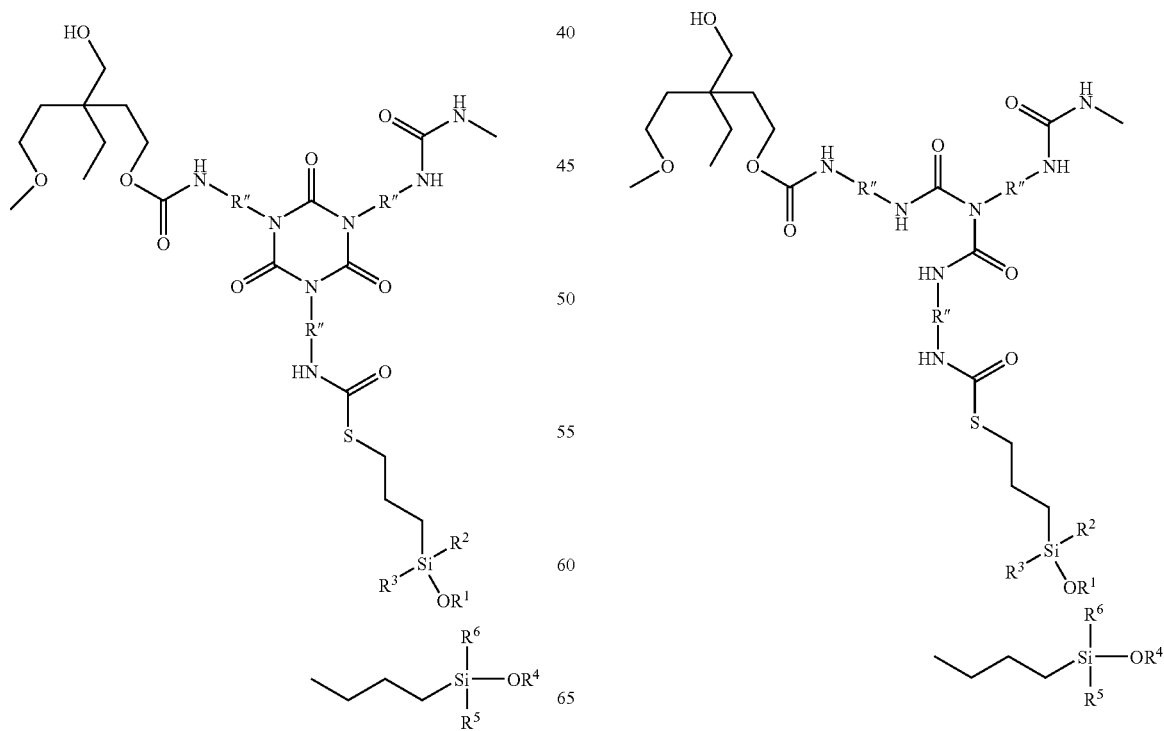

wherein R″ represents a divalent residue;
R¹ represents methyl or ethyl,
R² represents a $C_1$- to $C_4$-alkyl or $OR^1$,
R³ represents H, a $C_1$- to $C_4$-alkyl or $OR^1$,
R⁴ represents R¹, methyl or ethyl;
R⁵ represents R², H, $C_1$- to $C_4$-alkyl or $OR^4$; and
R⁶ represents R³, H, $C_1$- to $C_4$-alkyl or $OR^4$.

2. Primer composition according to claim 1, wherein the silane-terminated compound of formula (VI) or (VII) is derived from
a polyisocyanate which has at least three isocyanate groups;
at least one silane of the formula (I)

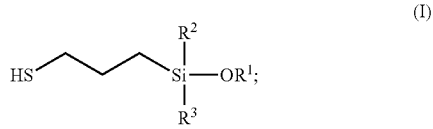

(I)

at least another silane of the formula (I') comprising isocyanate-reactive groups

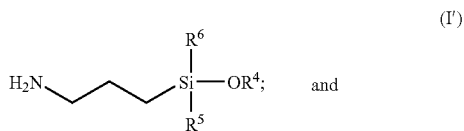

(I')

a cross-linking agent having at least three isocyanate-reactive functional groups.

3. Primer composition according to claim 1, wherein $R^6=OR^4$.

4. Primer composition according to claim 1, wherein $R^4$=methyl.

5. Primer composition according to claim 1, wherein the primer composition is essentially free from isocyanate groups.

6. Primer composition according to claim 2, wherein the polyisocyanate is a biuret or an isocyanurate of one or more diisocyanates or an adduct of polyisocyanate and polyol.

7. Primer composition according to claim 2, wherein the polyisocyanate is an isocyanurate of an aliphatic diisocyanate.

8. Primer composition according to claim 1, wherein $R^3=OR^1$.

9. Primer composition according to claim 1, wherein $R^1$=methyl.

10. Primer composition according to claim 2, wherein the at least three isocyanate-reactive functional groups of the cross-linking agent are identical.

11. Primer composition according to claim 2, wherein the cross-linking agent is a polyol.

12. Primer composition according to claim 2, wherein the cross-linking agent has a OH-equivalent weight of 30-350 g/eq.

13. Primer composition according to claim 2, wherein the cross-linking agent has a molecular weight of 90-1000 g/mol.

14. Primer composition comprising a compound of formula (VI) or (VII) comprising isocyanate-reactive groups

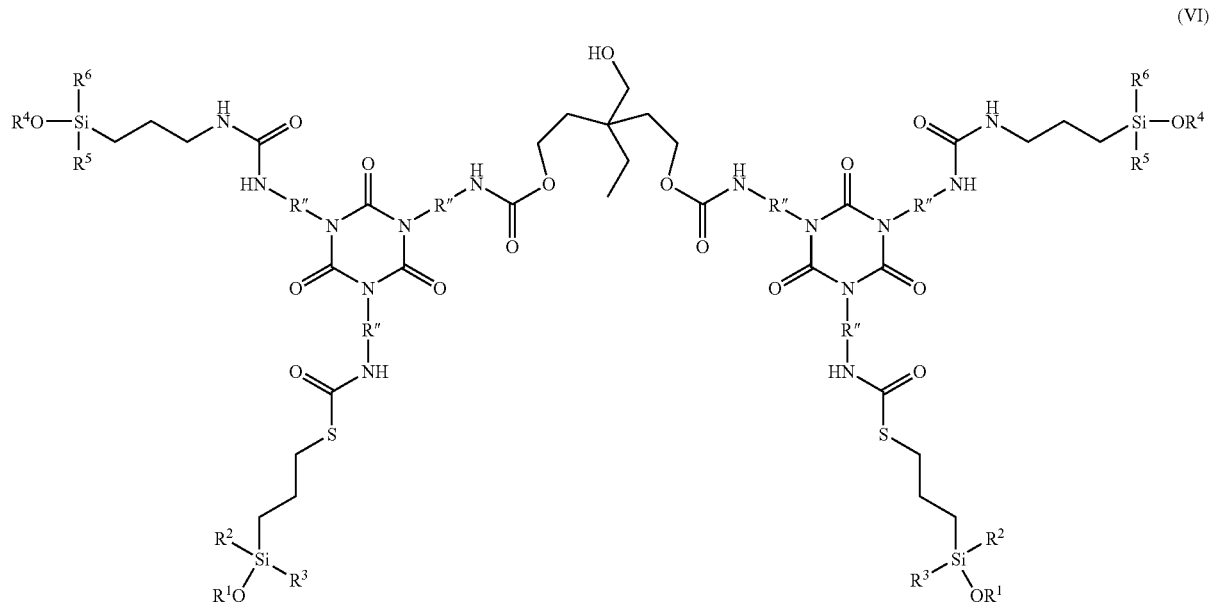

(VI)

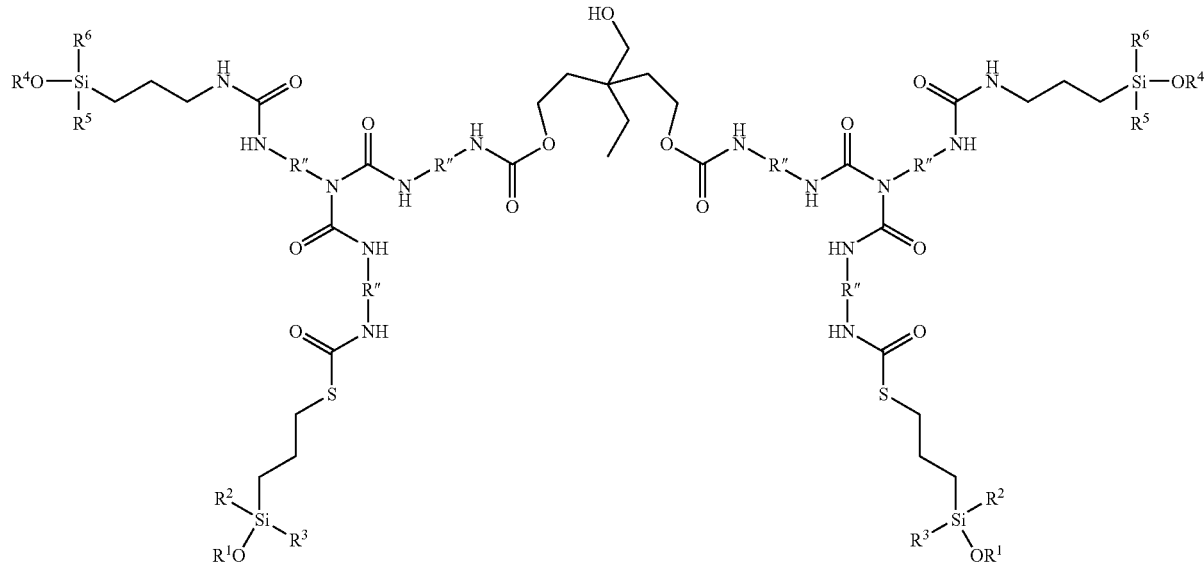

(VII)

wherein
R″ represents a divalent residue;
R¹ represents methyl or ethyl,
R² represents a $C_1$- to $C_4$-alkyl or $OR^1$,
R⁴ represents H, a $C_1$- to $C_4$-alkyl or $OR^1$,
R⁵ represents R¹, methyl or ethyl;
R⁵ represents R², H, $C_1$- to $C_4$-alkyl or $OR^4$; and
R⁶ represents R³, H, $C_1$- to $C_4$-alkyl or $OR^4$, the compound derived from a reaction of
a product carrying isocyanate groups and formed from a reaction of polyisocyanate which has at least three isocyanate groups and at least a silane of the formula (I)

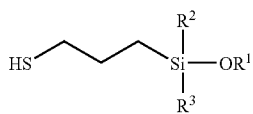

and a silane of formula (I')

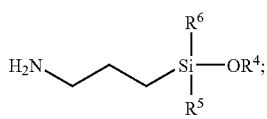

the reaction to form the product being conducted in a stoichiometric excess of isocyanate groups of the polyisocyanate with respect to the isocyanate-reactive groups of the silane of formula (I) and the silane of formula (I'); and
a cross-linking agent having at least three isocyanate-reactive functional groups.

15. Primer composition according to claim 1, wherein the primer composition further includes a coupling agent.

16. Primer composition according to claim 15, wherein the coupling agent is a trialkoxy silane carrying primary amino groups.

17. Primer composition according to claim 1, further comprising a catalyst.

18. Primer composition according to claim 1, further comprising a solvent which does not react with isocyanates at room temperature.

19. Primer composition according to claim 1, further comprising a filler.

20. Method of using the primer composition according to claim 1 as a primer for adhesives, sealants or floorings.

21. Method comprising applying a primer composition according to claim 1 by means of brush, felt, cloth or sponge on a substrate manually or automatically or by means of robots.

22. Method according to claim 21, wherein the substrate is glass or glass ceramics.

23. The primer composition according to claim 2, wherein the cross-linking agent includes free isocyanate-reactive functional groups.

24. The primer composition according to claim 1, wherein the primer composition comprises the silane-terminated compound in a solution free of water.

* * * * *